ns/h2>

United States Patent
Kang et al.

(10) Patent No.: US 7,268,822 B2
(45) Date of Patent: Sep. 11, 2007

(54) DE-INTERLACING ALGORITHM RESPONSIVE TO EDGE PATTERN

(75) Inventors: Moon Gi Kang, Seoul (KR); Min Kyu Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 503 days.

(21) Appl. No.: 10/898,526

(22) Filed: Jul. 23, 2004

(65) Prior Publication Data

US 2005/0036062 A1 Feb. 17, 2005

(30) Foreign Application Priority Data

Aug. 12, 2003 (KR) .................. 10-2003-0055812

(51) Int. Cl.
*H04N 7/01* (2006.01)
(52) U.S. Cl. ..................................... 348/448
(58) Field of Classification Search ............... 348/448, 348/441, 449, 451, 452, 458, 459; 375/240.21
See application file for complete search history.

(56) References Cited

U.S. PATENT DOCUMENTS 5,682,205 A * 10/1997 Sezan et al. ............... 348/452
5,786,862 A * 7/1998 Kim et al. .................. 348/448
6,606,126 B1 * 8/2003 Lim et al. .................. 348/452
6,909,752 B2 * 6/2005 Zhou ..................... 375/240.21
6,999,128 B2 * 2/2006 Kasahara et al. ........... 348/452
7,023,487 B1 * 4/2006 Adams ...................... 348/448
7,035,481 B2 * 4/2006 Kim et al. .................. 382/300
2002/0047930 A1* 4/2002 Zhou ......................... 348/578
2004/0135926 A1 7/2004 Song et al.

FOREIGN PATENT DOCUMENTS

EP 0 687 104 A3 12/1995

* cited by examiner

*Primary Examiner*—Paulos M. Natnael
(74) *Attorney, Agent, or Firm*—F. Chau & Associates, LLC

(57) ABSTRACT

There is provided a de-interlacing method including: receiving first and third image lines; selecting an upper vector having an N number of pixels among the first image lines, and selecting a lower vector having an N number of pixels among the third image lines; obtaining a weighted value on the basis of a relation between the pixels within the upper vector and a relation between the pixels within the lower vector; selecting an edge direction from the selected upper vector, the selected lower vector, and the obtained weighted value; and interpolating a pixel belonging to a second image line between the first and third image lines on the basis of the selected edge direction.

22 Claims, 6 Drawing Sheets

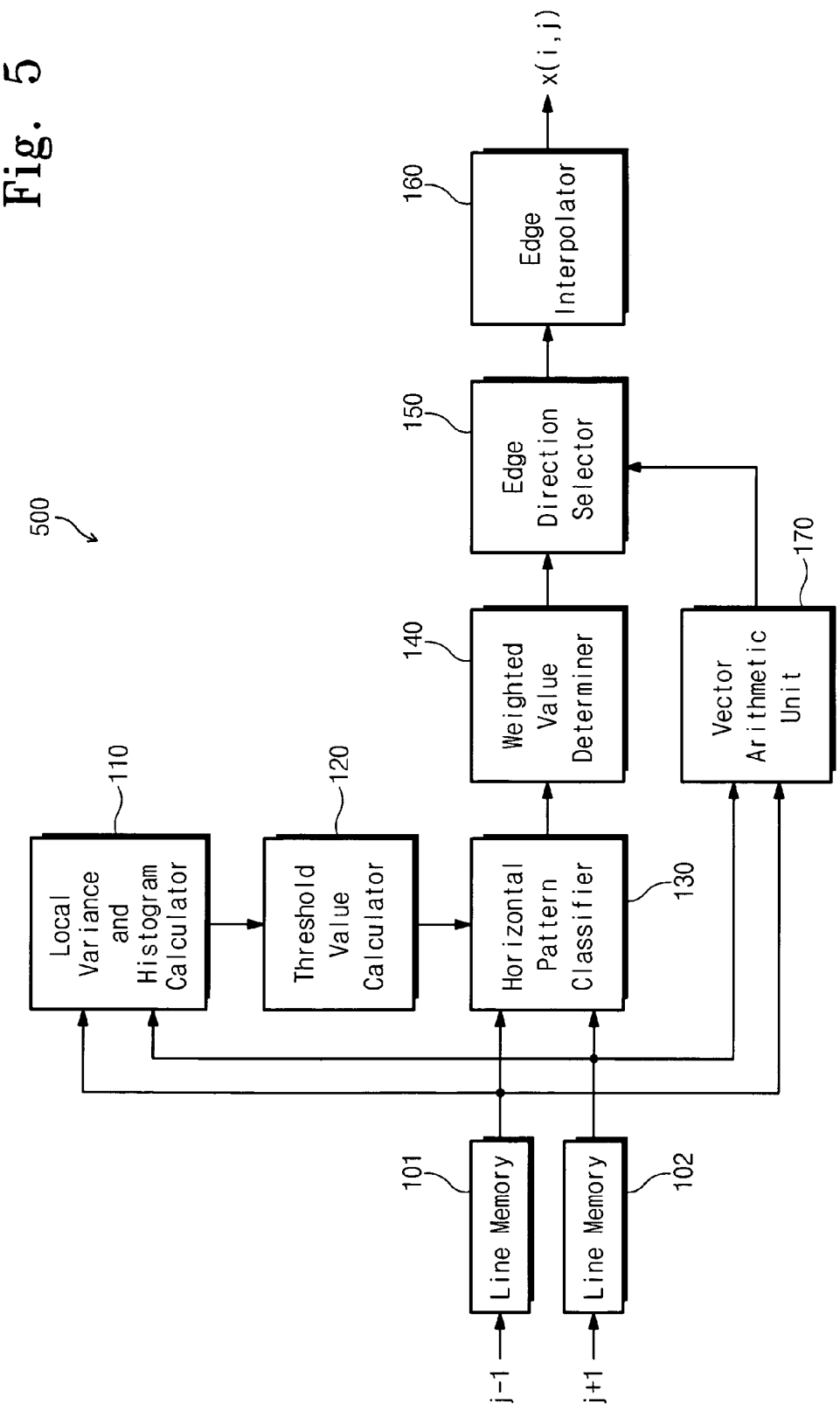

DE-INTERLACING ALGORITHM RESPONSIVE TO EDGE PATTERN

BACKGROUND OF THE INVENTION

1. Field of the Invention

The present invention relates to an algorithm to interpolate between lines of an image.

2. Description of the Related Art

In the case where a one-frame image is extracted from a moving image signal of a video camera, a camcorder, a television set ("TV") or a video cassette recorder ("VCR") using an interlaced scanning method with two fields for one frame to obtain an image signal of a non-interlaced scanning method, if motion in the moving image is generated due to a time difference between a first field and a second field or a handshake or the like, a difference between respective fields is conspicuous so that a phenomenon of a step-shape or tooth-shape is generated at an edge portion of the image having the motion.

To eliminate this phenomenon, it is necessary to properly modify the image data using an interlaced scanning method. This procedure is called "de-interlace". Such methods include an intra-field method where lines of data of one-field are interpolated to generate data of one frame, and an inter-field method where data from at least two fields are used to generate data of one frame.

The intra-field type of method may include a linear interpolation, a median filtering, a Nest Median Filter ("NMF")/Median Averaging Filter ("MAF"), an edge-adaptive interpolation and the like. The inter-field type of method may include a motion adaptive method, a Vertical Temporal ("VT") filtering, a Motion Compensation ("MC"), a weighted median filtering and the like. Further, the de-interlacing method may be a hybrid-type method including a method in which the lines of data of one field are interpolated to generate data of one frame, combined with a method where data of at least two frames are used to generate data of one frame. In current technology, the edge adaptive interpolation and the hybrid-type method are used frequently.

The edge adaptive interpolation based on an edge direction uses other information called "edge" in comparison to the linear interpolation, an edge line average being a simple edge-adaptive interpolation method is defined as follows.

[Equation 1]:

$$x_i(i, j, n) = \frac{x(i-\hat{d}, j-1, n) + x(i+\hat{d}, j+1, n)}{2}$$

In Equation 1, $\hat{d}$ is a value of a horizontal edge motion. $\hat{d}$ is obtained using a difference value according to the following rule.

[Equation 2]:

$$\hat{d} = \arg\min_{-1 \leq d \leq 1} \text{diff}(d)$$

In the Equation 2, a difference value diff (d) is calculated from the following Equation 3.

$$\text{diff}(d) = |x(i-d, j-1, n) - x(i+d, j+1, n)|$$   [Equation 3]

Since a characteristic of the edge appears even in a horizontal direction as well as in a vertical direction, a contour line is not only well maintained, but also since a vertical resolution is used as information on the horizontal direction while an edge dependent interpolation ("EDI") procedure is performed, aliasing may be better eliminated in comparison to a linear method. However, in cases where the image signal includes noise, in cases where a thin edge is provided for the background having the same brightness value, in cases where the same pattern repetitively appears, such as a check pattern, for example, in cases where an edge boundary is not clear, or in cases where the brightness value is different at the same region, for examples, de-interlacing using an edge-dependent interpolation typically erroneously estimates the edge direction thereby causing an error and an artifact in the de-interlacing procedure.

SUMMARY OF THE INVENTION

Accordingly, the present invention is directed to a de-interlacing algorithm based on a horizontal edge pattern that substantially obviates one or more problems due to limitations and disadvantages of the related art. It is a feature of the present invention to provide a de-interlacing algorithm that can restore image data of an interlaced scanning method to an image frame close to an original image frame.

Additional features and advantages of the invention will be set forth in part in the description which follows and in part will become apparent to those having ordinary skill in the art upon examination of the following or may be learned from practice of the invention. The features and other advantages of the invention may be realized and attained by the structure particularly pointed out in the written description and claims hereof as well as the appended drawings.

In an aspect of the present invention, there is provided a de-interlacing method including: receiving first and third image lines; selecting an upper vector having an N number of pixels among the first image lines, and selecting a lower vector having an N number of pixels among the third image lines; obtaining a weighted value on the basis of a relation between the pixels within the upper vector and a relation between the pixels within the lower vector; selecting an edge direction from the selected upper vector, the selected lower vector, and the obtained weighted value; and interpolating a pixel belonging to a second image line between the first and third image lines on the basis of the selected edge direction.

In a preferred embodiment, the weighted value obtaining step includes: classifying an upper image pattern from the relation between the pixels within the upper vector and classifying a lower image pattern from the relation between the pixels within the lower vector; and obtaining the weighted value from the classified upper image pattern and lower image pattern.

The upper image pattern is classified depending on a brightness variation between adjacent pixels within the upper vector, and the lower image pattern is classified depending on a brightness variation between adjacent pixels within the lower vector.

The upper image pattern has (N−1) number of symbols respectively defined as increase (I), decrease (D) or fixity (F) depending on a brightness variation between two adjacent pixels within the upper vector, and the lower image pattern has (N−1) number of symbols respectively defined as increase (I), decrease (D) or fixity (F) depending on a brightness variation between two adjacent pixels within the lower vector.

In this embodiment, the weighted value is provided in (N-1) number respectively corresponding to the (N-1) number of symbols for the upper image pattern and the (N-1) number of symbols for the lower image pattern.

In this embodiment, if an n (n=1, 2, ..., N-1)$^{th}$ symbol for the upper image pattern is the increase (I) and an n$^{th}$ symbol for the lower image pattern is the increase (I), an n$^{th}$ weighted value is set as a first value. If the n (n=1, 2, ..., N-1)$^{th}$ symbol for the upper image pattern is the decrease (D) and the n$^{th}$ symbol for the lower image pattern is the decrease (D), the n$^{th}$ weighted value is set as the first value. If the n (n=1, 2, ..., N-1)$^{th}$ symbol for the upper image pattern is a fixity (F) and the n$^{th}$ symbol for the lower image pattern is the increase (I) or the decrease (D), the n$^{th}$ weighted value is set as a second value. If the n (n=1, 2, ..., N-1)$^{th}$ symbol for the lower image pattern is the fixity (F) and the n$^{th}$ symbol for the upper image pattern is the increase (I) or the decrease (D), the n$^{th}$ weighted value is set as the second value. If the n (n=1, 2, ..., N-1)$^{th}$ symbol for the upper image pattern is the increase (I) and the n$^{th}$ symbol for the lower image pattern is the decrease (D), the n$^{th}$ weighted value is set as a third value. If the n (n=1, 2, ..., N-1)$^{th}$ symbol for the upper image pattern is the decrease (D) and the n$^{th}$ symbol for the lower image pattern is the increase (I), the n$^{th}$ weighted value is set as the third value. If the n (n=1, 2, ..., N-1)$^{th}$ symbol for the upper image pattern is the fixity (F) and the n$^{th}$ symbol for the lower image pattern is the fixity (F), the n$^{th}$ weighted value is set as the second value. The third value is larger than the second value, and the second value is larger than the first value.

In a preferred embodiment, the edge direction selecting step comprises the step of multiplying the weighted values with an absolute value of a difference between the upper vector and the lower vector to calculate the difference between the upper vector and the lower vector; and selecting the edge direction from the upper vector and the lower vector having a minimal difference between the upper vector and the lower vector.

In a preferred embodiment, the threshold value is set to be proportional to a variance value for a local region of image data, and a difference between brightnesses respectively corresponding to an upper 20% and a lower 20% of a histogram for the local region.

In another aspect of the present invention, there is provided a de-interlacing device including: first and second line memories for respectively storing first and third image lines therein; an image pattern classifier for selecting an upper vector having N number of pixels among the first image line stored in the first line memory and classifying an upper image pattern from a relation between pixels within the selected upper vector, and selecting a lower vector having N number of pixels among the third image line stored in the second line memory and classifying a lower image pattern from a relation between pixels within the selected lower vector; a weighted value determiner for obtaining at least one weighted value on the basis of the upper image pattern and the lower image pattern classified by the image pattern classifier; an edge direction selector for selecting an edge direction from the selected upper vector, the selected lower vector and the obtained weighted value; and an edge interpolator for interpolating a pixel belonging to a second image line between the first image line and the third image line on the basis of the selected edge direction.

In a preferred embodiment, the image pattern classifier classifies the upper image pattern depending on a comparison result of a threshold value and a brightness difference between adjacent pixels within the upper vector, and classifies the lower image pattern depending on a comparison result of the threshold value and a brightness difference between adjacent pixels within the lower vector.

In this embodiment, the threshold value is set to be proportional to a variance value for a local region of image data, and a difference between brightnesses respectively corresponding to an upper 20% and a lower 20% of a histogram for the local region.

It is to be understood that both the foregoing summary and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a view illustrating hardware for performing a de-interlacing algorithm according to a preferred embodiment of the present invention;

DETAILED DESCRIPTION OF PREFERRED EMBODIMENTS

Reference will now be made in detail to the preferred embodiments of the present invention, examples of which are illustrated in the accompanying drawings. However, the present invention is not limited to the embodiments illustrated herein after, and the embodiments herein are rather introduced to provide easy and complete understanding of the scope and spirit of the present invention.

Figure 1:
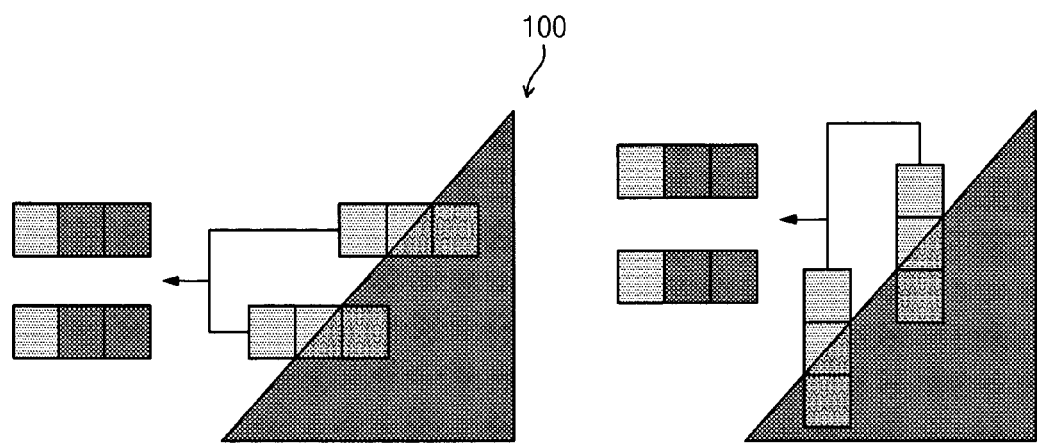
FIG. 1 is a view illustrating an example of a horizontal pattern and a vertical pattern arranged along an edge direction.

As shown in FIG. 1, a right-triangled edge is indicated generally by the reference numeral 100. Generally, an edge pattern appears along an edge direction. However, the edge pattern exists even along a horizontal direction or a vertical direction as well as the edge direction. FIG. 1 directly illustrates this feature. A right-triangled edge illustrated in FIG. 1 maintains a certain pattern for the horizontal direction and the vertical direction. This pattern differently appears along the horizontal/vertical direction and every object, and can be used for an interpolation of image data, that is, a de-interlacing procedure.

A de-interlacing algorithm based on a horizontal edge pattern according the present invention is based on a vector having a size of N instead of a pixel unit. The de-interlacing algorithm based on the vector is less sensitive to a main external cause such as noise.

Figure 2:
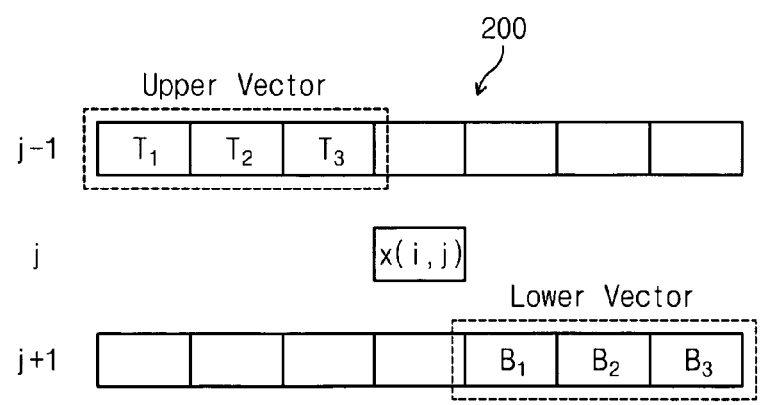
FIG. 2 is a view illustrating one example of an upper vector and a lower vector having sizes of 3.

Turning to FIG. 2, upper and lower vectors are indicated generally by the reference numeral 200. FIG. 2 is a view illustrating one example of an upper vector and a lower vector having sizes of 3.

Figure 3:
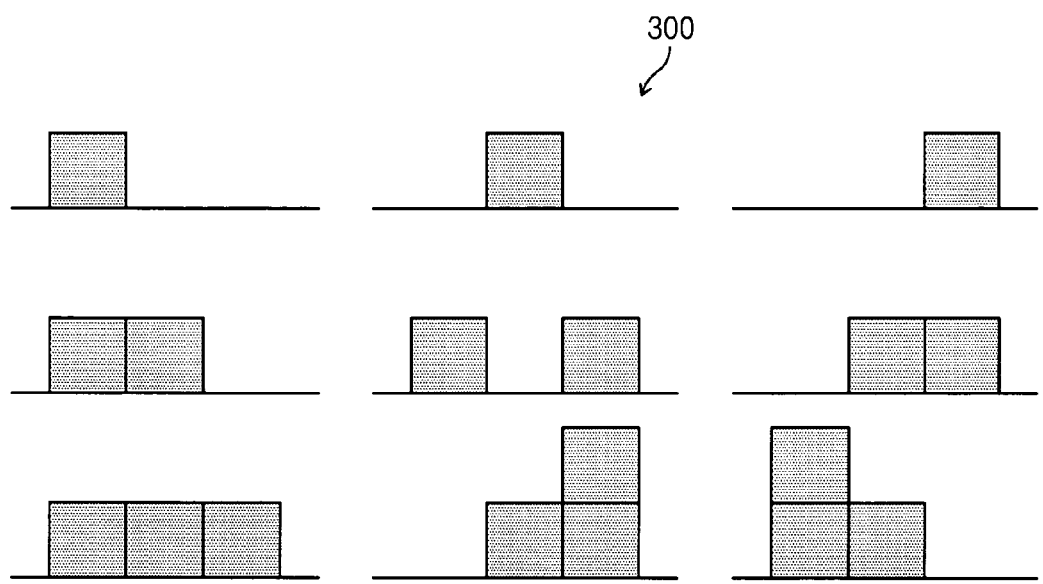
FIG. 3 is a view illustrating various patterns of vectors having sizes of 3.

Turning also to FIG. 3, vector patterns are indicated generally by the reference numeral 300. FIG. 3 is a view illustrating various patterns of vectors having sizes of 3. Each of the patterns of FIG. 3 has the same brightness of a middle pixel. However, each of the patterns has a different format depending on a brightness variation of an adjacent pixel.

Referring back to FIG. 2, image data of a pixel x(i,j) belonging to a horizontal line j to be interpolated is interpolated from image data of an upper horizontal line (j−1) and a lower horizontal line (j+1). In order to interpolate the pixel x(i,j), the upper vector and the lower vector can be respectively defined as u(l,d) and v(m,d).

[Equation 4]:

$$u(l,d) = \begin{bmatrix} x(i+\hat{d}+l-1, j-1) \\ x(i+\hat{d}+l, j-1) \\ x(i+\hat{d}+l+1, j-1) \end{bmatrix} = \begin{bmatrix} T_1 \\ T_2 \\ T_3 \end{bmatrix}$$

[Equation 5]:

$$v(m,d) = \begin{bmatrix} x(i-\hat{d}+m-1, j+1) \\ x(i-\hat{d}+m, j+1) \\ x(i-\hat{d}+m+1, j+1) \end{bmatrix} = \begin{bmatrix} B_1 \\ B_2 \\ B_3 \end{bmatrix}$$

In the Equations 4 and 5, l and m respectively represent parameters for expressing vector positions in a horizontal direction at a position of the pixel x(i,j) that should be interpolated, $\hat{d}$ means a slope of the edge. $T_1$, $T_2$ and $T_3$ mean brightness values of respective pixels at the upper vector, and $B_1$, $B_2$ and $B_3$ represent brightness values of respective pixels at the lower vector.

Figure 4A:
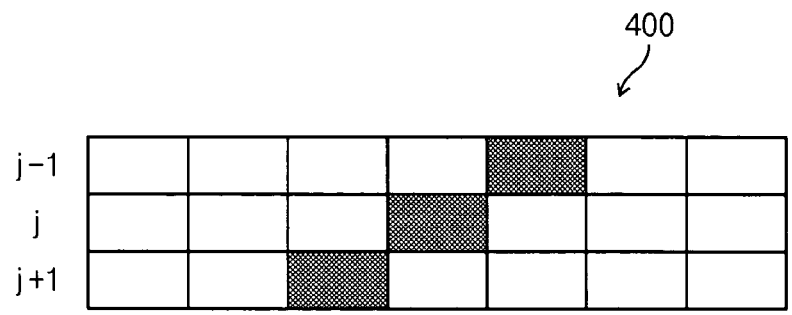
FIGS. 4A and 4B are views illustrating a conventional drawback.
Figure 4B:
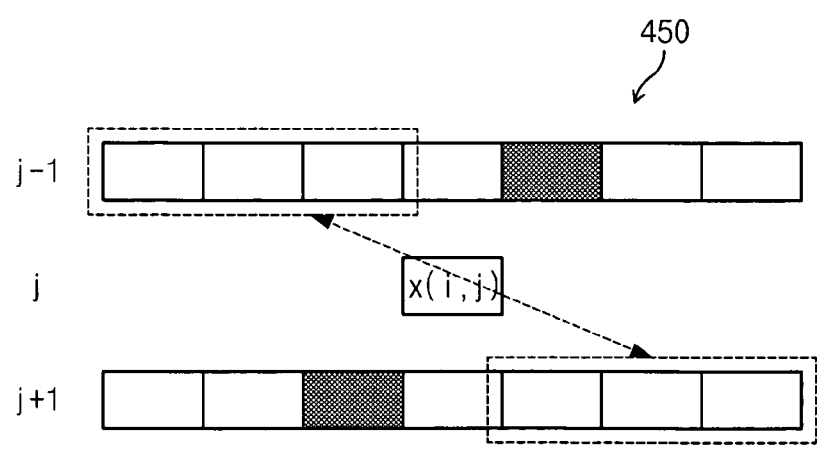

As described above, the edge direction is estimated in a direction having a least sum of differences between the upper vector and the lower vector. However, in cases where there is a noise or the edge is thin, a conventional de-interlacing algorithm depending on only the difference between the upper vector and the lower vector cannot be expected to have good performance. FIGS. 4A and 4B illustrate a conventional drawback.

As shown in FIGS. 4A and 4B, an original frame and image lines are indicated generally by the reference numerals 400 and 450, respectively. In a case where an original frame shown in FIG. 4A is scanned using an interlacing method, image data of a $(j-1)^{th}$ line and a $(j+1)^{th}$ line are provided as illustrated in FIG. 4B. At this time, image data of a $j^{th}$ line should be interpolated. In interpolating the pixel x(i,j), since the edge is thin and the background is large, the pixel x(i,j) can be interpolated according to the background instead of the edge of the object. In order to solve this drawback, the present invention performs a contour line interpolation using the edge pattern.

As mentioned above, the edge pattern largely exists along the edge direction, the vertical direction and the horizontal direction. The present invention discloses a de-interlacing algorithm based on only the horizontal pattern. However, those skilled in the art can easily embody the de-interlacing algorithm based on the vertical pattern, for example.

Turning to FIG. 5, a de-interlacing apparatus is indicated generally by the reference numeral 500. FIG. 5 is a view illustrating hardware for performing a de-interlacing algorithm according to a preferred embodiment of the present invention.

Figure 6:
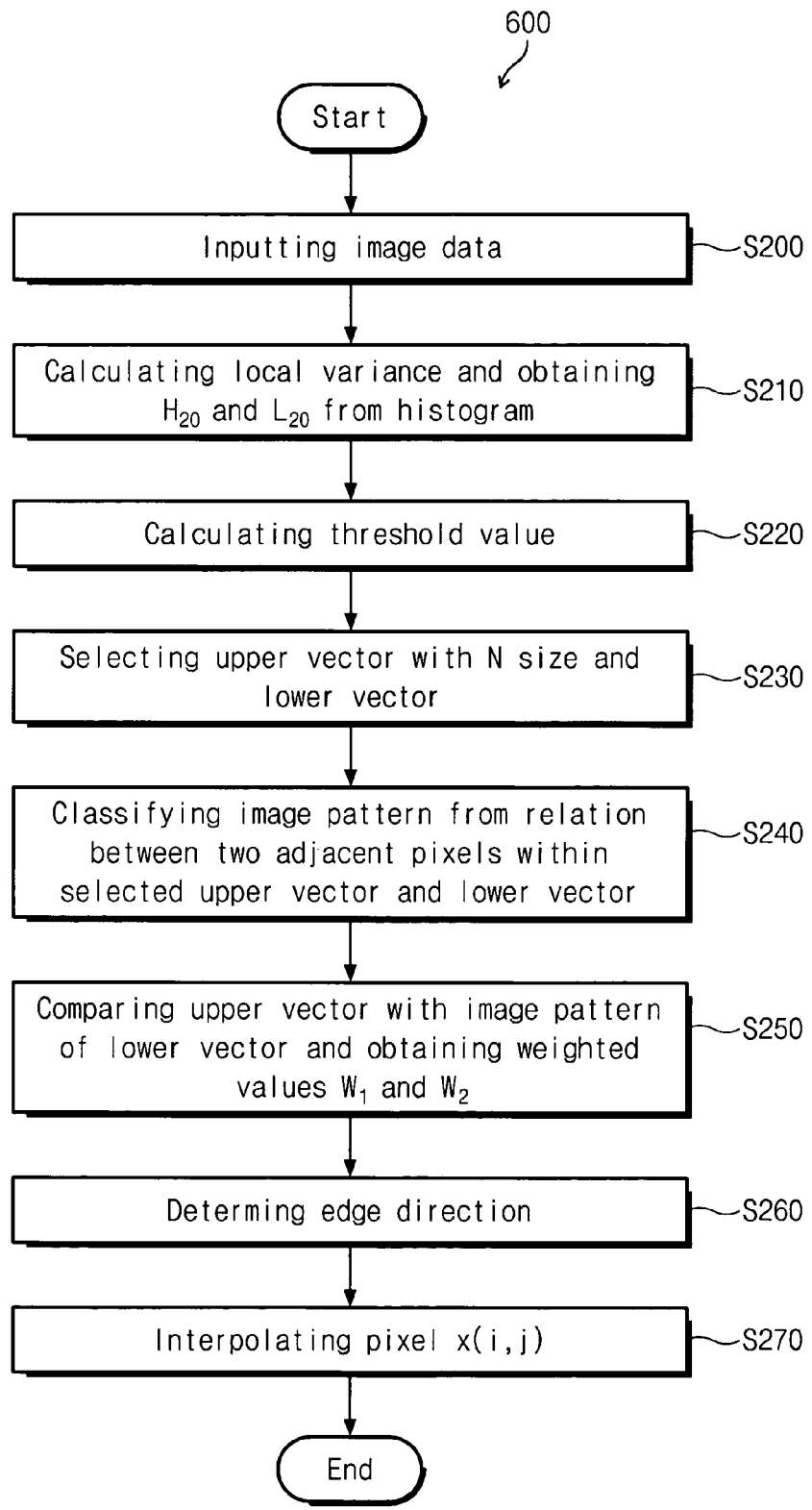
FIG. 6 is a flow chart illustrating a de-interlacing algorithm according to a preferred embodiment of the present invention.

Turning also to FIG. 6, a flow chart illustrating a de-interlacing algorithm according to a preferred embodiment of the present invention is indicated generally by the reference numeral 600.

Referring back to FIG. 5, the image data of the $(j-1)^{th}$ horizontal line of one frame is stored in a line memory 101, and the image data of the $(j+1)^{th}$ horizontal line is stored in a line memory 102 (S200). The line memories 101 and 102 respectively have the sizes of allowing the image data of one horizontal line to be concurrently stored therein.

A horizontal pattern classifier 130 classifies an image pattern of data stored in the line memories 101 and 102. In order to classify the image pattern, the upper vector and the lower vector should be selected as shown in FIG. 2 (S230). In this embodiment, the sizes N of the upper vector and the lower vector are 3 respectively. That is, the upper vector includes three pixels $T_1$, $T_2$ and $T_3$, and the lower vector includes three pixels $B_1$, $B_2$ and $B_3$.

The horizontal pattern classifier 130 classifies the image pattern from a relation between two adjacent pixels within the selected upper vector and lower vector. The image pattern is classified into three groups.

class 0(Increase) $I_{T1,T2}$:|$T_1-T_2$|>th and $T_2-T_1$>0 class 1(Decrease) $D_{T1,T2}$:|$T_1-T_2$|>th and $T_2-T_1$<0 class 2(Flat) $F_{T1,T2}$:|$T_1-T_2$|<th     [Equation 6]

When a difference between adjacent image data is larger than a threshold value (th), and $T_2$ is larger than $T_1$, the image pattern is classified into a first group, that is, "increase." When the difference between the adjacent image data is larger than the threshold value (th), and $T_1$ is larger than $T_2$, the image pattern is classified into a second group, that is, "decrease." Last, if the difference between the adjacent image data is smaller than the threshold value (th), it is classified into a third group, that is, "fixity". The image pattern classified into "increase" is represented as "I", and the image pattern classified into "decrease" is represented as "D", and the image pattern classified into "fixity" is represented as a symbol "F". In the above method, the image patterns for $T_2$ and $T_3$, $B_1$ and $B_2$, and $B_2$ and $B_3$ are classified. The threshold value (th) is in detail described afterwards.

A weighted value determiner 140 determines weighted values $w_1$ and $w_2$ from the classified upper image pattern and lower image pattern (S250). Since the upper image vector and the lower image vector respectively include three pixels in the present invention, two weighted values are obtained. If the upper vector and the lower vector respectively include five pixels, four weighted values are obtained. A method for obtaining the weighted value is as in the following Equation 7.

if (($I_{T1,T2}$&&$I_{B1,B2}$)or($D_{T1,T2}$&&$D_{B1,B2}$)) $w_1$=1 else if (($F_{T1,T2}$&&$I_{B1,B2}$)or($F_{T1,T2}$&&$D_{B1,B2}$)) $w_1$=2 else if (($I_{T1,T2}$&&$F_{B1,B2}$)or($D_{T1,T2}$&&$F_{B1,B2}$)) $w_1$=2 else if (($I_{T1,T2}$&&$D_{B1,B2}$)or($D_{T1,T2}$&&$I_{B1,B2}$)) $w_1$=3 else $w_1$=2     [Equation 7]

Herein, if the pattern of the upper vector is the increase ($I_{T1, T2}$) and the pattern of the lower vector is the increase ($I_{B1, B2}$), or if the pattern of the upper vector is the decrease ($D_{T1,T2}$) and the pattern of the lower vector is the decrease ($D_{B1,B2}$), the weighted value becomes small ($w_1=1$). To the contrary, if the pattern of the upper vector is the increase ($I_{T1, T2}$) and the pattern of the lower vector is the decrease ($D_{B1, B2}$), or if the pattern of the upper vector is the decrease ($D_{T1, T2}$) and the pattern of the lower vector is the decrease ($I_{T1,T2}$), the weighted value becomes large ($W_1=3$). Herein, noted is that in case that the patterns of the upper vector and the lower vector are all fixities ($F_{T1,T2}$, $F_{B1,B2}$), an appropriate middle weighted value is set as a middle value ($w_1=2$). As aforementioned in FIG. 4A, in case that the edge is thin, when a background portion is found, the image pattern is classified into the "fixity (F)" due to the vector pixels having the similar brightness such that the weighted value is determined larger than a portion following the original edge direction. Therefore, the edge direction can be exactly found.

The Equation 7 illustrates a method for obtaining the weighted value $w_1$ from $T_1$, $T_2$, $B_1$, and $B_2$, and the weighted value $w_2$ can be obtained from $T_2$, $T_3$, $B_2$, and $B_3$ in the similar method.

An edge direction selector 150 selects the edge direction from the weighted values $w_1$ and $w_2$ (S260).

$$diff(l,m,d)=|u(l,d)-v(m,d)|\times w_1 \times W_2 \qquad \text{[Equation 8]}$$

Additionally, $\hat{l}$, $\hat{m}$ and $\hat{d}$ are determined as follows.

[Equation 9]:

$$(\hat{l}, \hat{m}, \hat{d}) = \arg\min_{\substack{-1 \le l, m \le 1 \\ -R \le d \le R}} \text{diff}(l, m, d)$$

Herein, l and m are ranged from –1 to 1, and d representing the slope of the edge direction is ranged from –R to R. According to a size of R, a limit of an angle for finding the slope of the edge direction is determined.

An edge interpolator 160 interpolates the pixel x(i,j) of the $j^{th}$ line from $\hat{l}$, $\hat{m}$ and $\hat{d}$ determined in the Equation 9 (S270).

[Equation 10]:

$$x(i, j) = \frac{x(i-1, j+a) + x(i-1, j+b) + x(i+1, j+c)x(i+1, j+e)}{4}$$

Herein, a, b, c and e are determined as in the following Equation 11.

Herein, $\hat{l}$ is a value representing the edge direction. Further, in order to operate the edge direction in a sub-pixel unit of the edge (Herein, 0.5 pixel unit), even $\hat{m}$ and $\hat{d}$ are again operated. Therefore, the present invention can estimate the edge direction of the sub-pixel unit depending on $\hat{l}$ and $\hat{m}$.

As described above, the horizontal pattern classifier 130 requires the threshold value (th) so as to classify the image pattern from the relation between two adjacent pixels within the selected upper vector and lower vector. This threshold value is determined in proportion to a local variance. However, since levels of a brightness are different from one another even within one image, and contrasts of the brightness are different every image at the time of processing several images, it is not desirable that the threshold value is set in proportion only to the local variance. For example, in case that the image is generally dark or light, the image is greatly influenced by the brightness itself as well as a microwave component such as the local variance. In order to solve this drawback, the present invention uses the histogram of the image. A local variance and histogram calculator 110 shown in FIG. 5 calculates the local variance and histogram from the image data of one frame (S210).

Figure 7:
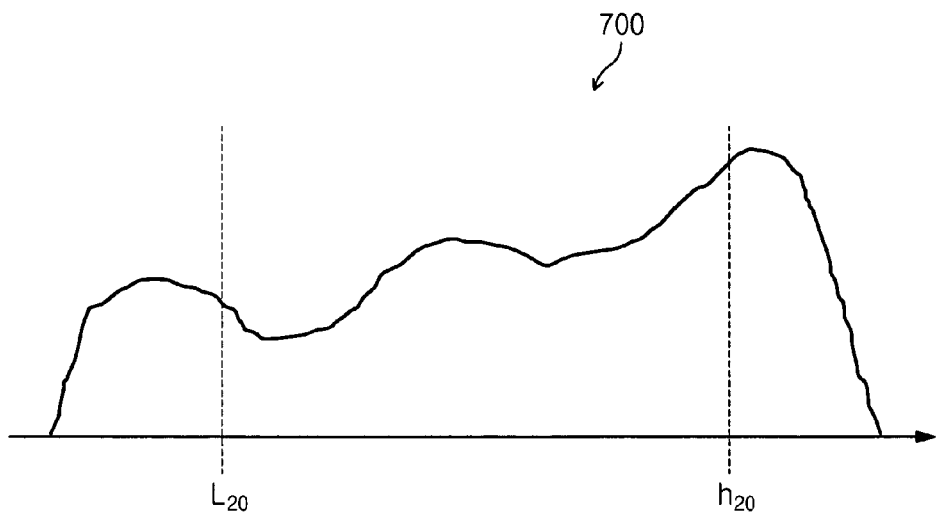
FIG. 7 is a view illustrating a histogram of a local region (32×32)

Turning now to FIG. 7, a histogram of the local 32×32 pixel region is indicated generally by the reference numeral 700. In FIG. 7, $H_{20}$ is a value of representing a brightness of an upper 20% point, and $L_{20}$ is a value of representing a brightness of a lower 20% point. $H_{20}$-$L_{20}$ is a standard of representing the contrast. A threshold value calculator 120 calculates the threshold value (th) from the calculated local variance (Var) and $H_{20}$-$L_{20}$ (S220).

$$th = \overline{th} \times \tan^{-1}((H_{20}-L_{20})\times\text{Var}\times k) + \tilde{th} \qquad \text{[Equation 12]}$$

In the Equation 12, $\overline{th}$, $\tilde{th}$ and k are constants, and var is a variance of a local region. The threshold value (th) is automatically calculated every frame.

Figure 8:
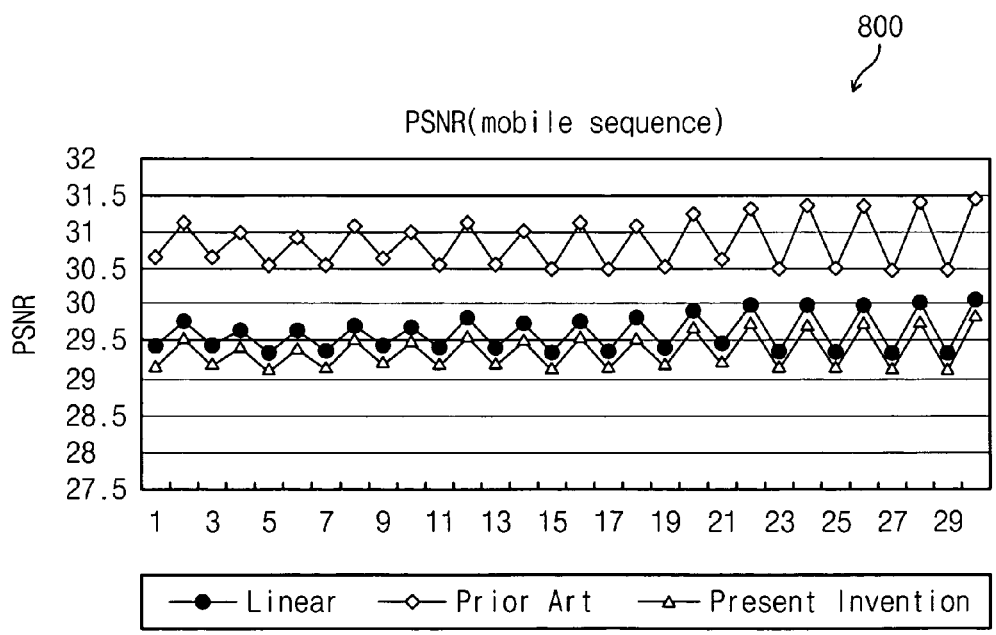
FIG. 8 is a view illustrating a comparison of a general linear interpolation, an Edge Dependent Interpolation ("EDI"), and a Peak-Signal-to-Noise ratio ("PSNR") at the time of de-interlacing at a moving sequence according to a preferred embodiment of the present invention.

As shown in FIG. 8, a mobile sequence is indicated generally by the reference numeral 800. FIG. 8 is a view illustrating a comparison of a general linear interpolation, an EDI (Edge Dependent Interpolation), and a PSNR (Peak-Signal-to-Noise ratio) at the time of de-interlacing at a moving sequence according to a preferred embodiment of the present invention. As shown in FIG. 8, the inventive de-interlacing algorithm has greatly excellent performance in comparison to the general linear interpolation or EDI.

As described above, the present invention has an improved result of de-interlacing in case that the image signal includes the noise, in case that the thin edge is provided for the background with the same brightness value, in case that the same pattern repetitively appears such as the check pattern, in case that an edge boundary is not clear, or in case that the brightness value is different at the same

[Equation 11]:

$$(a, b, c, e) = \begin{cases} (\hat{d}, \hat{d}, -\hat{d}, -\hat{d}) & \text{if } (\hat{l}, \hat{m}) = (-1,-1), (0,0), (1,1) \\ (\hat{d}-1, \hat{d}, -\hat{d}, 1-\hat{d}) & \text{if } (\hat{l}, \hat{m}) = (-1,0), (0,1) \\ (\hat{d}-1, \hat{d}-1, 1-\hat{d}, 1-\hat{d}) & \text{if } (\hat{l}, \hat{m}) = (-1,1) \\ (\hat{d}, \hat{d}+1, -1-\hat{d}, -\hat{d}) & \text{if } (\hat{l}, \hat{m}) = (0,-1), (1,0) \\ (\hat{d}+1, \hat{d}+1, -1-\hat{d}, -1-\hat{d}) & \text{if } (\hat{l}, \hat{m}) = (1,-1) \end{cases}$$

region. Therefore, the image data of the interlaced method can be restored closely to the original image frame.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A de-interlacing method comprising:
   receiving first and third image lines;
   selecting an upper vector having an N number of pixels among the first image lines, and selecting a lower vector having an N number of pixels among the third image lines;
   obtaining a weighted value on the basis of a relation between the pixels within the upper vector and a relation between the pixels within the lower vector;
   selecting an edge direction from the selected upper vector, the selected lower vector, and the obtained weighted value; and
   interpolating a pixel belonging to a second image line between the first and third image lines on the basis of the selected edge direction,
   wherein the weighted value obtaining step comprises:
   classifying an upper image pattern from the relation between the pixels within the upper vector, and classifying a lower image pattern from the relation between the pixels within the lower vector; and
   obtaining the weighted value from the classified upper image pattern and lower image pattern.

2. The de-interlacing method of claim 1, wherein the upper image pattern is classified depending on a brightness variation between adjacent pixels within the upper vector, and the lower image pattern is classified depending on a brightness variation between adjacent pixels within the lower vector.

3. The de-interlacing method of claim 1, wherein the upper image pattern is classified depending on a comparison result of a threshold value and a brightness difference between the adjacent pixels within the upper vector, and the lower image pattern is classified depending on a comparison result of a threshold value and a brightness difference between the adjacent pixels within the lower vector.

4. The de-interlacing method of claim 3, wherein the upper image pattern has (N−1) number of symbols respectively defined as increase (I), decrease (D) or fixity (F) depending on a brightness variation between two adjacent pixels within the upper vector, and
   wherein the lower image pattern has (N−1) number of symbols respectively defined as increase (I), decrease (D) or fixity (F) depending on a brightness variation between two adjacent pixels within the lower vector.

5. The de-interlacing method of claim 4, wherein the weighted value is provided in (N−1) number respectively corresponding to the (N−1) number of symbols for the upper image pattern and the (N−1) number of symbols for the lower image pattern.

6. The de-interlacing method of claim 5, wherein if an n (n=1, 2, . . . , N−1)th symbol for the upper image pattern is the increase (I) and an nth symbol for the lower image pattern is the increase (I), an nth weighted value is set as a first value.

7. The de-interlacing method of claim 6, wherein if the n (n=1, 2, . . . , N−1)th symbol for the upper image pattern is the decrease (D) and the nth symbol for the lower image pattern is the decrease (D), the nth weighted value is set as the first value.

8. The de-interlacing method of claim 7, wherein if the n (n=1, 2, . . . , N−1)th symbol for the upper image pattern is a fixity (F) and the nth symbol for the lower image pattern is the increase (I) or the decrease (D), the nth weighted value is set as a second value.

9. The de-interlacing method of claim 8, wherein if the n (n=1, 2, . . . , N−1)th symbol for the lower image pattern is the fixity (F) and the nth symbol for the upper image pattern is the increase (I) or the decrease (D), the nth weighted value is set as the second value.

10. The de-interlacing method of claim 9, wherein if the n (n=1, 2, . . . , N−1)th symbol for the upper image pattern is the increase (I) and the nth symbol for the lower image pattern is the decrease (D), the nth weighted value is set as a third value.

11. The de-interlacing method of claim 10, wherein if the n (n=1, 2, . . . , N−1)th symbol for the upper image pattern is the decrease (D) and the nth symbol for the lower image pattern is the increase (I), the nth weighted value is set as the third value.

12. The de-interlacing method of claim 11, wherein if the n (n=1, 2, . . . , N−1)th symbol for the upper image pattern is the fixity (F) and the nth symbol for the lower image pattern is the fixity (F), the nth weighted value is set as the second value.

13. The de-interlacing method of claim 12, wherein the third value is larger than the second value, and the second value is larger than the first value.

14. The de-interlacing method of claim 13, wherein the edge direction selecting step comprises the step of multiplying the weighted values with an absolute value of a difference between the upper vector and the lower vector to calculate the difference between the upper vector and the lower vector.

15. The de-interlacing method of claim 14, further comprising the step of selecting the edge direction from the upper vector and the lower vector having a minimal difference between the upper vector and the lower vector.

16. The de-interlacing method of claim 3, wherein the threshold value is set to be proportional to a variance value for a local region of image data.

17. The de-interlacing method of claim 16, wherein the threshold value is proportional to a difference between brightnesses respectively corresponding to an upper 20% and a lower 20% of a histogram for the local region.

18. A de-interlacing device comprising:
   first and second line memories for respectively storing first and third image lines therein;
   an image pattern classifier for selecting an upper vector having N number of pixels among the first image line stored in the first line memory and classifying an upper image pattern from a relation between pixels within the selected upper vector, and selecting a lower vector having N number of pixels among the third image line stored in the second line memory and classifying a lower image pattern from a relation between pixels within the selected lower vector;
   a weighted value determiner for obtaining at least one weighted value on the basis of the upper image pattern and the lower image pattern classified by the image pattern classifier;
   an edge direction selector for selecting an edge direction from the selected upper vector, the selected lower vector and the obtained weighted value; and an edge interpolator for interpolating a pixel belonging to a second image line between the first image line and the third image line on the basis of the selected edge direction.

19. The de-interlacing device of claim 18, wherein the image pattern classifier classifies the upper image pattern depending on a comparison result of a threshold value and a brightness difference between adjacent pixels within the upper vector, and classifies the lower image pattern depending on a comparison result of the threshold value and a brightness difference between adjacent pixels within the lower vector.

20. The de-interlacing device of claim 19, wherein the threshold value is set to be proportional to a variance value for a local region of image data.

21. The de-interlacing device of claim 20, wherein the threshold value is proportional to a difference between brightnesses respectively corresponding to an upper 20% and a lower 20% of a histogram for the local region.

22. A program storage device readable by machine, tangibly embodying a program of instructions executable by the machine to perform method steps for de-interlacing an image, the method steps comprising:

receiving first and third lines of the interlaced image;

selecting an upper vector having a plurality of pixels from the first image line, and selecting a lower vector having a plurality of pixels from the third image line;

obtaining a weighted value responsive to a relation between the pixels within the upper vector and a relation between the pixels within the lower vector;

selecting an edge direction responsive to the selected upper vector, the selected lower vector, and the obtained weighted value; and interpolating a pixel for a second image line disposed between the first and third image lines that is responsive to the selected edge direction;

wherein the weighted value obtaining step comprises:

classifying an upper image pattern from the relation between the pixels within the upper vector, and classifying a lower image pattern from the relation between the pixels within the lower vector; and obtaining the weighted value from the classified upper image pattern and lower image pattern.

* * * * *